United States Patent [19]

Mendoza et al.

[11] Patent Number: 5,494,400

[45] Date of Patent: Feb. 27, 1996

[54] BATTERY PLATE STACKER

[75] Inventors: Roel Mendoza, Fort Gratiot; Robert R. Rader; David Yanik, both of Port Huron, all of Mich.

[73] Assignee: Wirtz Manufacturing Co., Inc., Port Huron, Mich.

[21] Appl. No.: 328,853

[22] Filed: Oct. 25, 1994

[51] Int. Cl.$^6$ .......................... B65G 57/14; B65H 29/38
[52] U.S. Cl. ................... 414/790.8; 414/790; 414/790.1; 198/817
[58] Field of Search .................................. 414/790, 790.1, 414/790.8, 794.4, 794.8; 271/273; 198/458, 586, 587, 624, 817

[56] References Cited

U.S. PATENT DOCUMENTS

| | | | |
|---|---|---|---|
| 3,290,041 | 12/1966 | Cunningham | 198/586 |
| 3,892,168 | 7/1975 | Grobman | 414/790.8 |
| 3,905,487 | 9/1975 | Hoke et al. | 414/790.8 |
| 3,915,316 | 10/1975 | Pomara, Jr. | 414/790 |
| 4,032,133 | 6/1977 | Steffens et al. | 270/68 |
| 4,083,747 | 4/1978 | Rochla | 414/790 |
| 4,134,330 | 1/1979 | Weickenmeier | 414/790.8 |
| 4,934,687 | 6/1990 | Hayden et al. | 414/794.4 |
| 5,322,272 | 6/1994 | Benz et al. | 414/790.8 |
| 5,350,170 | 9/1994 | Emigh et al. | 271/273 |

*Primary Examiner*—William E. Terrell
*Assistant Examiner*—Douglas A. Hess
*Attorney, Agent, or Firm*—Barnes, Kisselle, Raisch, Choate, Whittemore & Hulbert

[57] ABSTRACT

Apparatus for transporting and stacking battery plates in which pasted battery plates are delivered from a drying oven to a stacking station by an entry conveyor. In the stacking station, a stack of battery plates builds up on a stacking elevator which then deposits the stack on a take-off conveyor. The take-off conveyor indexes, moving the stack of battery plates out of the stacking station to make room for the next stack. A change elevator moves into the stacking station to handle incoming battery plates while the stacking elevator deposits a stack on the take-off conveyor and the take-off conveyor indexes to remove the stack. A partial stack of battery plates accumulates on the change elevator. When the previous stack has been removed from the stacking station, the partial stack is transferred from the change elevator to the stacking elevator, a full stack builds up on the stacking elevator and the cycle repeats.

23 Claims, 6 Drawing Sheets

BATTERY PLATE STACKER

FIELD OF THE INVENTION

This invention relates generally to a battery plate stacker and more particularly to apparatus for collecting and stacking pasted battery plates.

BACKGROUND OF THE INVENTION

In the past, pasted battery plates from the drying oven have been delivered one by one to a stacking station by an entry conveyor. At the stacking station, a stack of battery plates builds up on a stacking elevator which then deposits the stack on a take-off conveyor. The take-off conveyor indexes, moving the stack of battery plates out of the stacking station to make room for the next stack. However, handling battery plates leaving the entry conveyor while the stacking elevator is depositing a stack of battery plates on the take-off conveyor and while the take-off conveyor is indexing to remove a stack from the stacking station has been a problem.

SUMMARY OF THE INVENTION

To deal with the problem, an apparatus with a change elevator is provided by this invention. The change elevator moves into the stacking station to handle incoming battery plates while the stacking elevator is depositing a stack of battery plates on the take-off conveyor and the take-off conveyor indexes to remove the stack. A partial stack of battery plates accumulates on the change elevator. Then when the previous stack has been moved out of the stacking station on the take-off conveyor, the partial stack is transferred from the change elevator to the stacking elevator, and when a full stack builds up on the stacking elevators, the cycle repeats. The change elevator operates as a temporary stacking elevator while the regular stacking elevator unloads and the unloadeded stack is removed from the stacking station. This allows for very high speed operation.

The entry conveyor may be arranged to handle single panels consisting of two battery plates side-by-side, or to handle the individual plates after they have been cut apart.

One object of this invention is to provide apparatus for collecting and stacking battery plates having the foregoing features.

Another object is to provide apparatus for collecting and stacking battery plates which is composed of a relatively few simple parts, is rugged and durable in use, is fast and efficient in operation, and is relatively easy to manufacture, assemble and operate.

BRIEF DESCRIPTION OF THE DRAWING

These and other objects, features and advantages will become more apparent as the following description proceeds of the best mode of this invention especially when considered with the accompanying drawings, wherein.

2

DETAILED DESCRIPTION

Referring now more particularly to the drawings, the apparatus 14 comprises an elongated entry conveyor 16 for advancing a succession of battery plate panels P along a predetermined path to a stacking station 18 at the unloading end 20 of the entry conveyor 16. The panels P in this instance consist of two uncut battery plates $P_1$ and $P_2$ but may, if desired, consist of a single battery plate panel. A stacking elevator 22 at the stacking station 18 is adapted to receive the battery plate panels P one by one and accumulate a stack of the panels as they drop over the unloading end 20 of the entry conveyor. A panel arrester 24 stops the advance of the battery plate panels after they leave the entry conveyor, causing them to drop vertically onto the stacking elevator 22.

A stack of battery plate panels P on the stacking elevator 22 is transferred to a stack receiver in the form of a take-off conveyor 26. During the transfer, a change elevator 28 moves into the stacking station 18 to accumulate a partial stack of panels. After the stacking elevator 22 has transferred its stack of panels to the take-off conveyor 26, the partial stack of panels on the change elevator 28 is transferred to the stacking elevator 22 which then proceeds to build up a complete stack of panels for subsequent transfer to the take-off conveyor 26.

Figure 1:
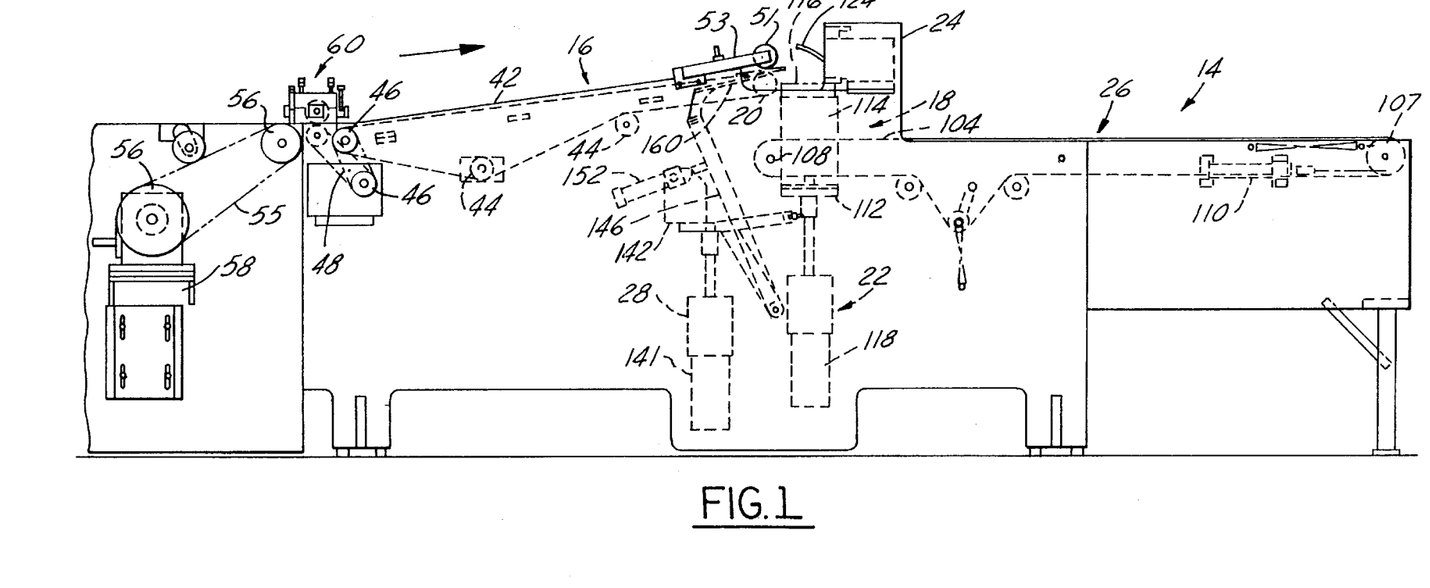
FIG. 1 is a side view of an apparatus constructed in accordance with the invention.

The entry conveyor 16 comprises a plurality of laterally spaced part, longitudinally extending endless strands or chains 30. At the loading end 32 of the entry conveyor, the chains 30 are trained over sprockets 34 mounted on a transverse shaft 36 which is perpendicular to the length of the conveyor. At the unloading end 20, the chains 30 are trained over sprockets 38 mounted on individual transverse stub shafts 40 which provide clearance for the change elevator bars 160 (see FIG. 7) and are perpendicular to the length of the entry conveyor. The entry conveyor is disposed at an upward incline, with its unloading end higher than the loading end. The top flight 42 of the entry conveyor which carries the panels P is generally flat. The lower flight passes over sprockets 44 on additional transverse shafts. The shaft 36 at the loading end of the entry conveyor on which the sprockets 34 are keyed, is driven by pulleys 46 and a belt 48 from a motor 50. The top flight 42 moves along a predetermined path in the direction of the arrow (see FIG. 1) to advance battery plate panels toward the unloading end. An idler roll 51 carried by a frame 53 presses down on the top flight 42 at the unloading end 20 to assist in the control of panels as they are discharged from the entry conveyor 16.

The battery plate panels are delivered to the entry conveyor 16 on a belt 52 which extends over a roll 54 driven by a belt 55 and pulleys 56 from a motor 58.

Figure 4:
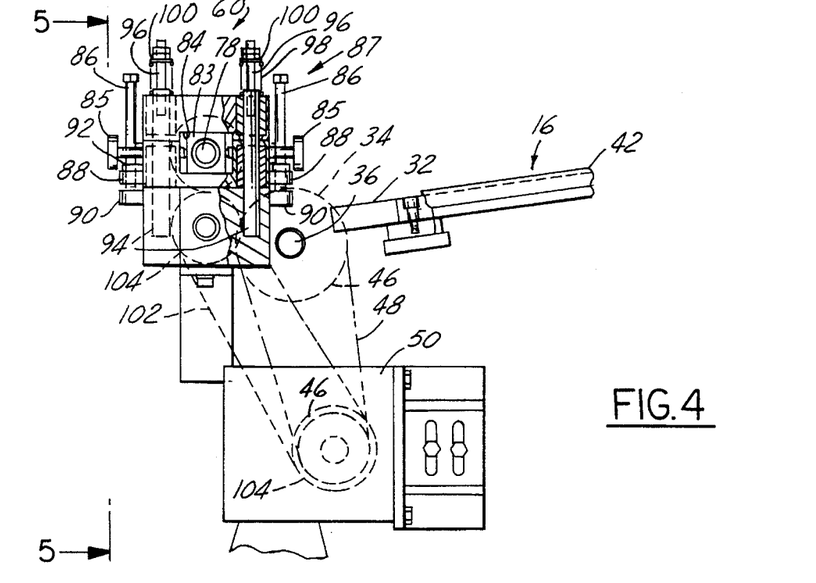
FIG. 4 is an enlarged fragmentary view of a portion of FIG. 1, illustrating the roll stand at the loading end of the entry conveyor.
Figure 5:
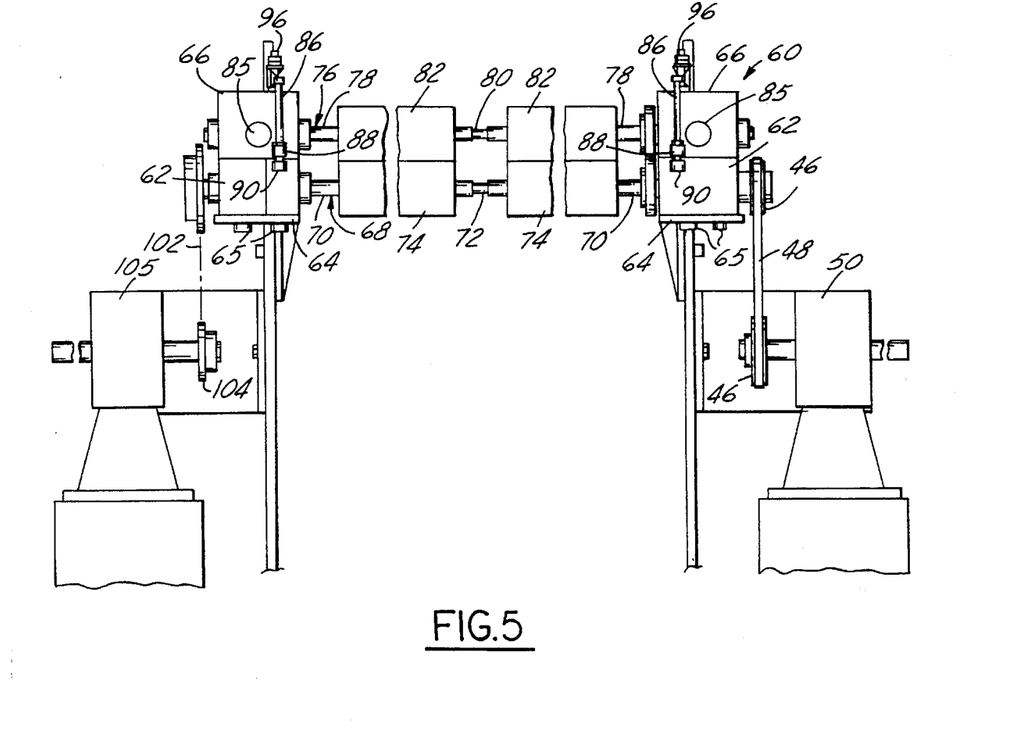
FIG. 5 is a view taken on the line 5—5 in FIG. 4.

An entry roll stand 60 receives the battery plate panels from the belt 52 and deposits them on the loading end 32 of the entry conveyor. The entry roll stand 60 comprises a pair of laterally spaced apart lower blocks 62 mounted on a fixed frame 64 by fasteners 65, and a pair of laterally spaced upper blocks 66 mounted on the respective lower blocks. The lower blocks 62 support the respective ends of a shaft assembly 68 composed of two axially aligned shafts 70 which are flexibly connected at the inner ends by a universal joint 72. Mounted on each shaft 70 is a roll 74.

The upper blocks 66 support the respective ends of a shaft assembly 76 composed of two axially aligned shafts 78 flexibly connected by a universal joint 80. Mounted on each shaft 78 is a roll 82. The two upper rolls 82 either peripherally contact or are closely spaced above the two lower rolls 74.

The shaft assemblies 68 and 76 are shown as parallel to one another and perpendicular to the length of the entry conveyor 16. However, the lower blocks 62 may be attached to the fixed frame 64 by the fasteners 65 in angularly adjusted positions about vertical axes as desired and for a purpose as described more fully hereinafter. Such angular adjustment is accommodated by the universal joints 72 and 80 for the shaft assemblies 68 and 76.

The shafts 78 are journalled in bearings 83 which are horizontally slidably adjustable in bearing tracks 84 in the upper blocks 66 lengthwise of the entry conveyor, that is, in the direction of advance of its top flight. The adjustment of the bearings 83 is accomplished by the screws 85 which thread into the upper blocks. This adjustment permits the upper rolls 82 to be placed directly above the lower rolls, or to be moved back or forth to control the trajectory of the discharged plates so they will be substantially parallel with the top run of the entry conveyor when received thereon.

The spacing between the rolls 74 and 82 is determined by the adjusting mechanism 87 on the sides of the roll stand 60. This mechanism includes a pair of elongated screws 86 threaded through nuts 88 projecting laterally outwardly from the opposite sides of the upper blocks 66. The lower ends of these screws 86 engage abutments 90 on the lower blocks 62. By advancing the screws 86 into engagement with the abutments 90 on the lower blocks, the upper blocks can be elevated to the desired height depending on the spacing desired between the rolls 74 and 82 which in turn depends on the thickness of the panels P. Lock nuts 92 on the screws 86 are provided to maintain the adjustment.

The upper blocks 66 are held down with respect to the lower blocks 62 with a yielding pressure. This is a spring-biased float and is accomplished by means including rods 94 anchored in the lower blocks 62 and extending upwardly and freely through passages in the upper blocks 66. Rods 94 have extensions 96 which project upwardly above the upper blocks 66 and are encircled by compression coil springs 98 which are compressed between collars 100 on the upper ends of the rod extensions 96 and the top surface of the upper blocks 66. The upper blocks 66 are thus permitted to move upwardly with respect to the lower blocks, but against the yielding pressure of the springs 98. The rolls 74 and 82 may be spaced apart a distance slightly less than the thickness of the battery plate panels P so as to engage the panels under the yielding pressure of the springs 98. The rolls 74 and 82 are driven by a belt 102 and pulleys 104 from the motor 105 and cooperate in gripping panels therebetween and advancing them to the entry conveyor.

The take-off conveyor 26 extends in straight line continuation of the path of the entry conveyor and comprises a plurality of laterally spaced apart endless strands or chains 104. At the loading end 106 of the take-off conveyor, which is slightly overlapped by the unloading end 20 of the entry conveyor 16, the chains 104 are trained over sprockets 107 mounted on a transverse shaft 108 perpendicular to the path of conveyor movement. At the opposite end, the chains 104 are trained over sprockets 107 on a transverse shaft 108 perpendicular to the conveyor path. The top flight 109 of the take-off conveyor 26 is generally horizontal and below the level of the unloading end 20 of the entry conveyor.

An air cylinder 110 operates a one-way clutch 111 on the shaft 108 to index the top flight 109 of the take-off conveyor incrementally. Each incremental advance of the top flight moves a stack of panels on the take-off conveyor far enough away from the stacking station so that sufficient space is provided for the next stack to be deposited on the top flight at the stacking station.

Figure 6:
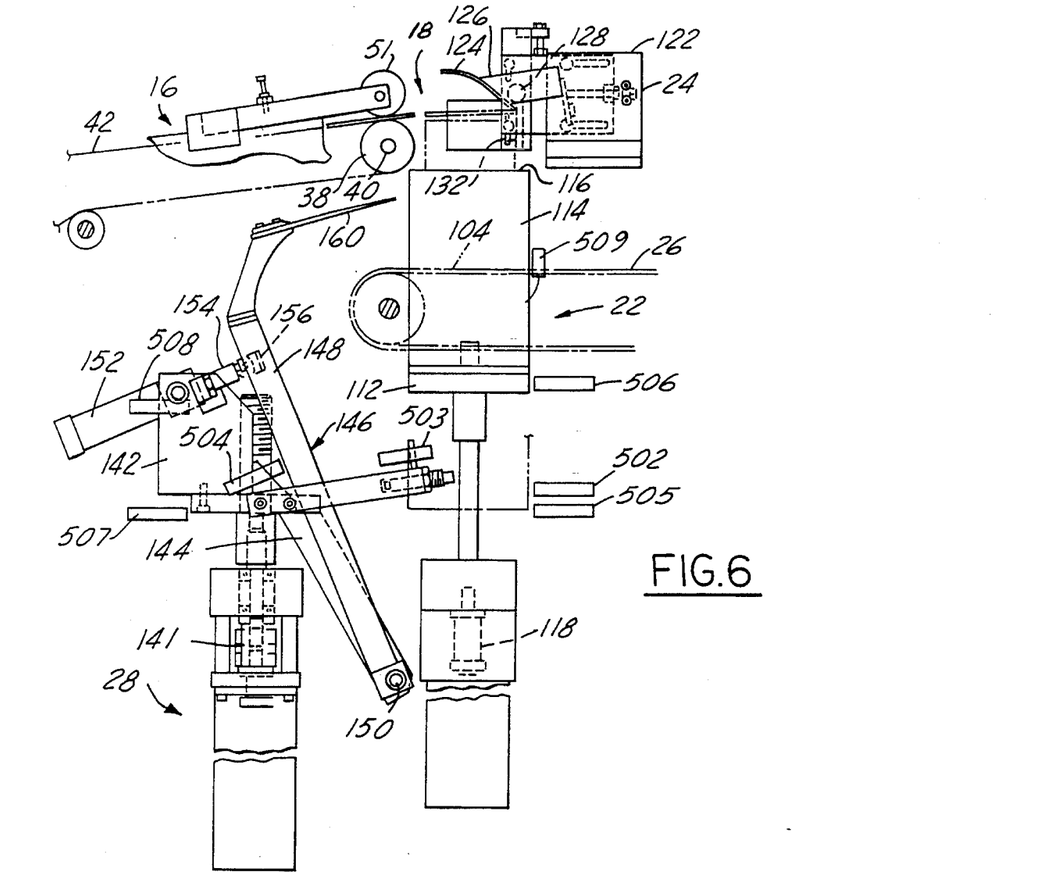
FIG. 6 is a side view of a portion of the structure shown in FIG. 1, illustrating the stacking elevator and the change elevator.

The stacking station 18 is located just beyond the unloading end 20 of the entry conveyor 16, which is adjacent to the loading end 106 of the take-off conveyor 26. The stacking elevator 22 is located at the stacking station. The stacking elevator 22 comprises a frame 112 having a plurality of upright, vertical support plates 114 which are parallel to the chains 104 of the take-off conveyor 26 and respectively extend into the spaces between the chains 104. The top surfaces of the plates 114 provide bars or panel supports 116 which are disposed in a common horizontal plane. The stacking elevator 22 is moved vertically from an upper position (FIG. 6) to a lower position (FIG. 7) by a linear actuator such as a servo motor and ball screw 118. In the upper position, the bars 116 of the support plates 114 are above the top flight 109 of the take-off conveyor and slightly below the level of the top flight 42 of the entry conveyor 16 at its unloading end 20. In the lower position, the bars 116 of the support plates are below the top flight 109 of the take-off conveyor 26.

The stacking elevator 22 is adapted to receive battery plate panels P one by one as they drop over the unloading end 20 of the entry conveyor 16. A stack of battery plate panels thus builds up on the top surfaces or bars of the plates 114 of the stacking elevator 22. The stacking elevator is adapted to descend either gradually or intermittently as the stack of battery plate panels builds up.

Figure 11:
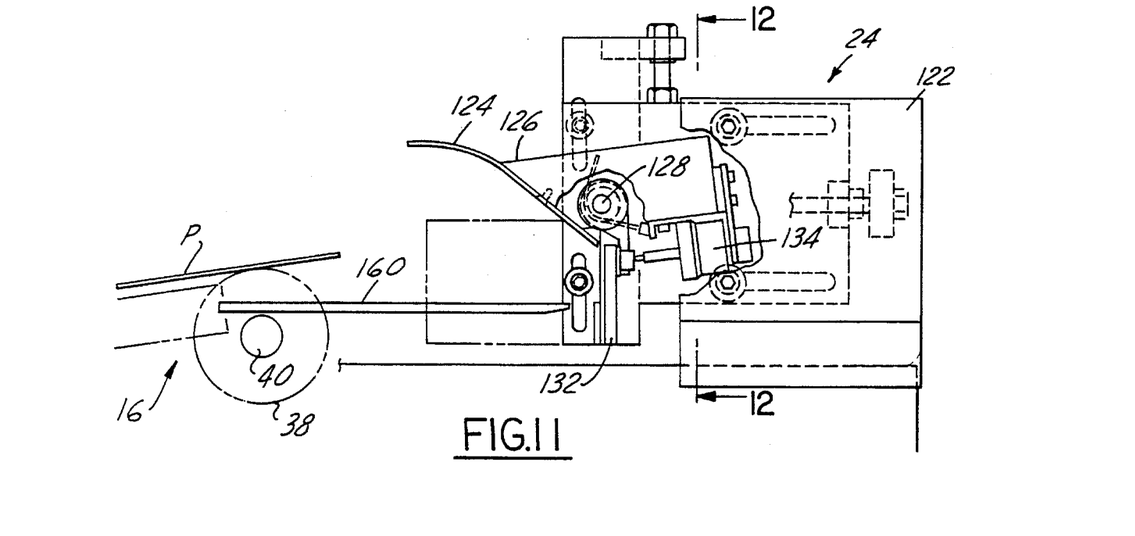
FIG. 11 is an enlarged view of a portion of FIG. 6 showing the panel arrester.
Figure 12:
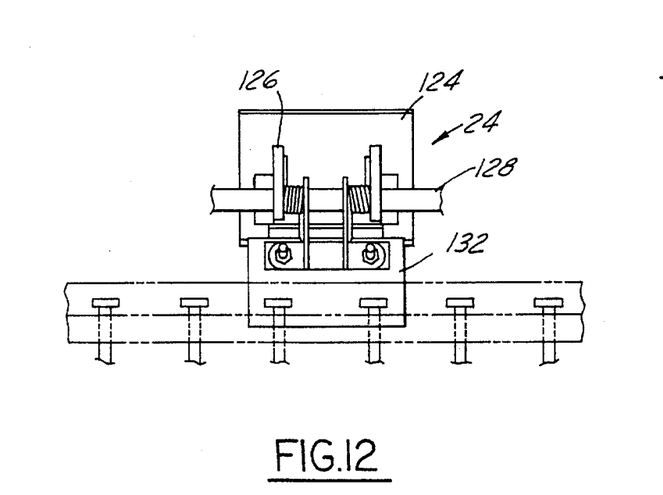
FIG. 12 is a sectional view taken on the line 12—12 in FIG. 11.

A panel arrester 24 is provided just beyond the unloading end 20 of the entry conveyor 16. The panel arrester 24 is designed to engage the battery plate panels P as they are discharged from the unloading end 20 of the entry conveyor, often at a speed of 100 to 200 feet per minute, stop their forward progress and cause them to drop vertically onto the stacking elevator 22. The panel arrester 24 comprises a housing 122 having a downwardly curved deflector plate 124 supported on a mounting block 126 which clamps to a transverse shaft 128 carried by the housing. Beneath the deflector plate is a bumper 132 which is a vertically disposed plate pivotally mounted to shaft 128 and backed up by a dashpot 134 to which it is secured. The dashpot yieldingly resists displacement to the right in FIG. 11 when the bumper is engaged by the forward end of a battery plate panel. Together, the deflector plate 124 and bumper 132 provide a means for a cushion stop for the front edges of the battery plate panels, causing them to drop vertically.

Figure 7:
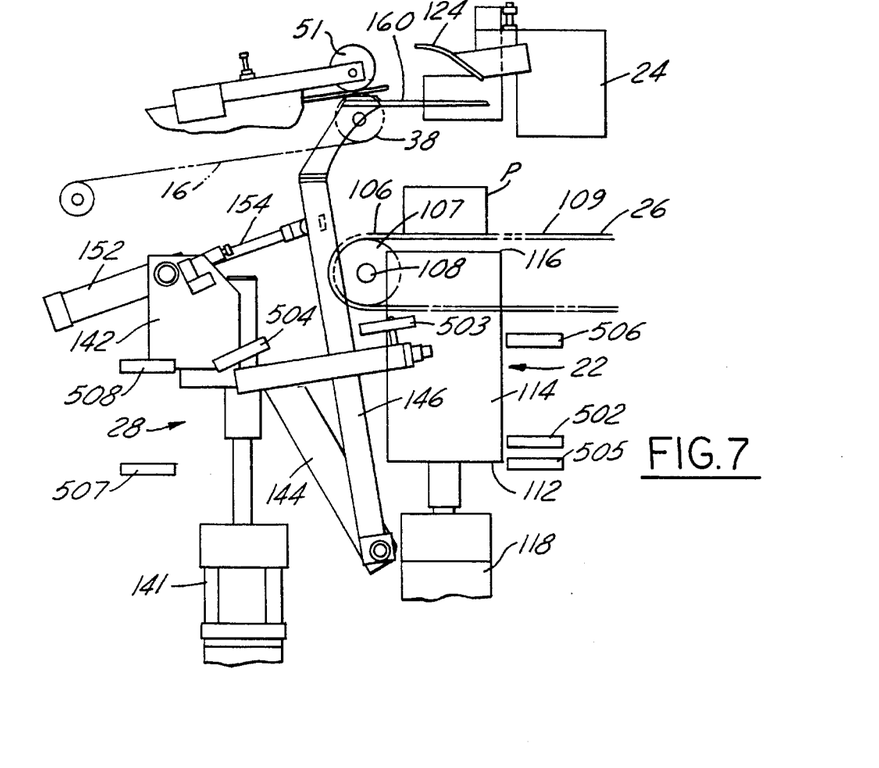
FIGS. 7 and 8 are similar to FIG. 6 but show the parts in different positions.
Figure 8:
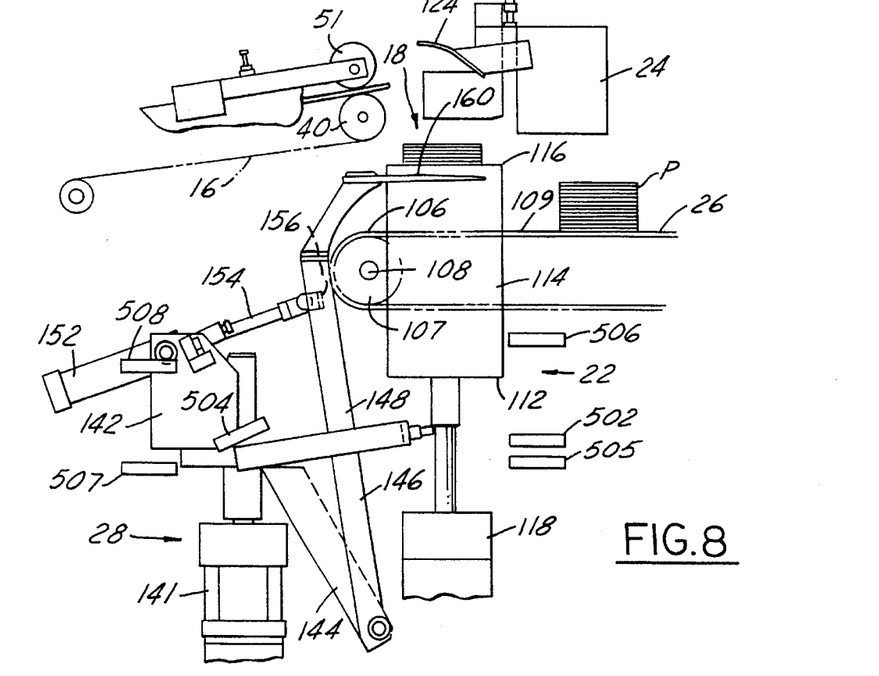
Figure 9:
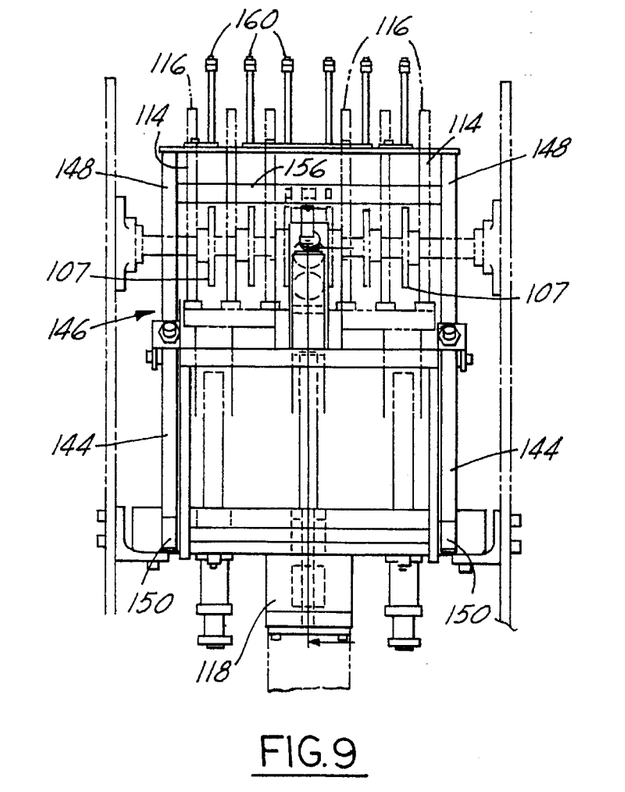
FIG. 9 is a fragmentary view taken at right angles to the views in FIGS. 6–8 showing the relationship of parts of the stacking elevator, the change elevator and the take-off conveyor.
Figure 10:
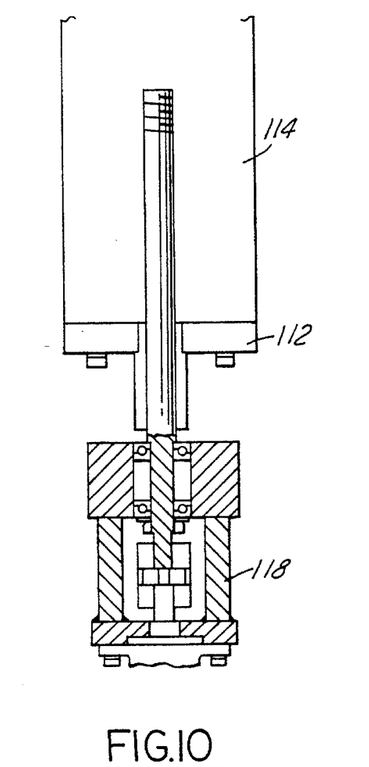
FIG. 10 is a fragmentary enlarged view partly in section showing a portion of FIG. 6.

Also located adjacent to the stacking station 18 is a change elevator 28 movable up and down by a linear actuator 141. The change elevator comprises a mounting base 142 having a pair of fixed bars 144 extending downwardly therefrom at an angle. A swing frame 146 comprising a pair of arms 148 pivoted at 150 to the lower ends of the bars 144 is swingable forwardly and rearwardly about an axis perpendicular to the path of conveyor movement. The swinging movement of the frame 146 is accomplished by a linear actuator 152 pivoted on the base 142 and having an extensible and retractible rod 154 pivoted to a cross member 156 of the swing frame 146. At the top of the swing frame 146 are a plurality of support bars or fingers 160 which extend from the swing frame in a forward direction with respect to the direction of conveyor travel. In the advanced position of the swing frame, these bars 160 occupy a common horizontal plane and overlie the stacking elevator as shown in FIGS. 7 and 8. In the withdrawn position, the bars 160 are retracted to the position shown in FIG. 6. The bars 160 are disposed in laterally spaced relation extending generally in the direction of conveyor travel and are located in planes bisecting the spaces between the respective panel support plates 114 of the stacking elevator 22. The support bar fingers 160 move forward in the same direction and similar arcuate path as the battery plate panels to complement their movement and minimize any chance for jams.

The stacking elevator 22 and the change elevator 28 work together in accumulating stacks of panels for transfer to the take-off conveyor 26. In brief, the stacking elevator 22 is raised to its upper limit in which the bars 116 at the top of the plates 114 are in the position shown in FIG. 6. The stacking elevator 22 begins to accumulate panels P while descending, preferably incrementally, as the stack builds. When the bars 116 are slightly above the top flight 109 of the take-off conveyor, the change elevator 28, which already has been raised to its upper position by actuator 141, has its support bars 160 projected forwardly by operation of the actuator 152 into the stacking station 18 above the stack of panels on the stacking elevator. The change elevator 28 proceeds to descend while accumulating a partial stack of panels on the bars 160. The stacking elevator 22 continues to descend although at an increased speed rate until support bars 116 on the top of the elevator plates 114 are below the top flight 109 of the take-off conveyor, thereby depositing the stack of panels onto the top flight 109. The take-off conveyor 26 is then indexed by the air cylinder 110 to remove the deposited stack of panels away from the stacking station. The stacking elevator 22 is then raised back above the support bars 160 of the change elevator 28 to lift the partial stack from the change elevator. The change elevator continues to descend although at an increased speed rate to its lower limit by operation of actuator 141, the bars 160 are retracted by actuator 152, and then the change elevator 28 is elevated back to its upper position by operation of actuator 141. The stacking elevator 22 with the partial stack taken from the change elevator 28 descends while continuing to accumulate a full stack and the cycle repeats.

Obviously these operations may be performed manually but preferably they are automatically carried out. It will be seen in the drawings that several limit switches may be provided to ensure proper sequencing. There is shown a proximity switch 506 which signals the upper limit of the stacking elevator which thereupon will begin to descend by operation of actuator 118 as it accumulates panels. The proximity switch 502 signals a lower position of the stacking elevator in which the support bars 114 supporting the stack are still above the top flight 109 of the take-off conveyor, operation of which energizes the actuator 152 to advance the supports bars 160 of the change elevator to the forward position.

The proximity switch 505 indicates the lowermost position of the stacking elevator in which the bars 114 are below the top flight 109 of the take-off conveyor, and this switch energizes the air cylinder 110 to index the take-off conveyor a distance sufficient to remove the stack of panels deposited on the top flight 109 from the area of the stacking station. There is a photoelectric switch 509 which signals the removal of the stack on the take-off conveyor from the area of the stacking station, and this signal causes the actuator for the stacking elevator to raise the stacking elevator to its upper limit and remove a partial stack that has accumulated on the bars 160 of the change elevator.

The proximity switch 503 indicates the advanced position of the bars 160 of the change elevator, signaling the actuator 141 to cause the change elevator to descend.

The photoelectric switch 500 indicates the position of panels on the entry conveyor and determines the timed relationship of the forward movement of the bars 160 of the change elevator so that it moves forward in proper relation to the incoming panels.

The proximity switch 504 indicates the retracted position of the bars 160 of the change elevator and signals the actuator 141 to raise the change elevator to its upper position.

The proximity switch 507 indicates the lower limit of the change elevator and the proximity switch 508 indicates the upper limit of the change elevator.

The proximity switch 510 associated with the air cylinder of the take-off conveyor indicates that the cylinder has made a full retracting stroke and should return to its extended position so that it is ready to make a retracting stroke when it is next called upon to index.

The photoelectric switch 501 is sometimes employed as an override so that in the event the stack of panels on the stacking elevator becomes too high because of extra thick panels, it will increase the rate of descent of the stacking elevator.

The system may include a jam detection feature with photoelectric switches 511 and 512 to detect a plate which has not landed flat on a stack after striking the plate arrester. If a jam occurs, the entry conveyor may be shut down or caused to shift to very slow speed in a shingling mode.

Figure 2:
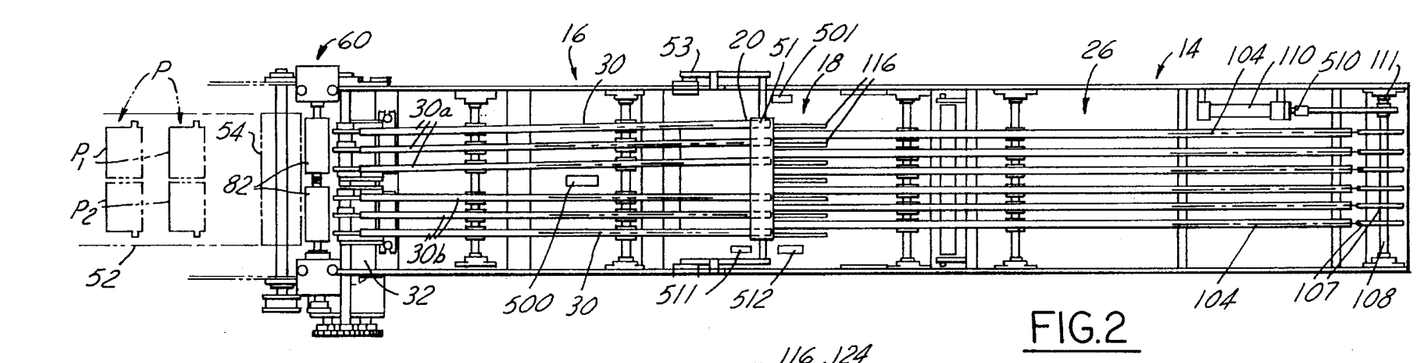
FIG. 2 is a top view of the apparatus shown in FIG. 1, but with the panel arresting device removed for clarity.

At times, it is desirable to separate the panels P into two battery plate panels $P_1$ and $P_2$ (by a cutter not shown) and for this purpose some of the chains 30a of the entry conveyor adjacent one side thereof may be separated from or splayed with respect to those chains 30b adjacent the other side. This may be seen in FIGS. 2 and 3 in which the three chains 30a are angled somewhat away from the three chains 30b. It should be understood that the upper and lower rolls 74 and 82 of the roll stand 60 grip the panels with sufficient force to separate them into individual plates if not completely separated or parted in the cutting operation.

This is accomplished by shifting the sprockets 34 for the chains 30a along the length of the shaft 36 on which they are keyed. To shift the sprockets 34, an adjustable transversely extending frame bar 202 is provided, which is mounted on a fixed frame member 204. The frame bar 202 is secured in transversely adjusted position by fasteners 206 extending through slots 208 in the frame bar and threaded into the fixed frame member. Arms 210 affixed to the frame bar 202 embrace the three sprockets 34 for chains 30a. Accordingly, the sprockets 34 for chains 30a may be adjusted axially by transversely shifting the frame bar 202.

The sprockets 34 for the chains 30b may be shifted along the length of shaft 36 by similar means including an adjustable frame bar 202a, fasteners 206a and arms 210a.

Figure 3:
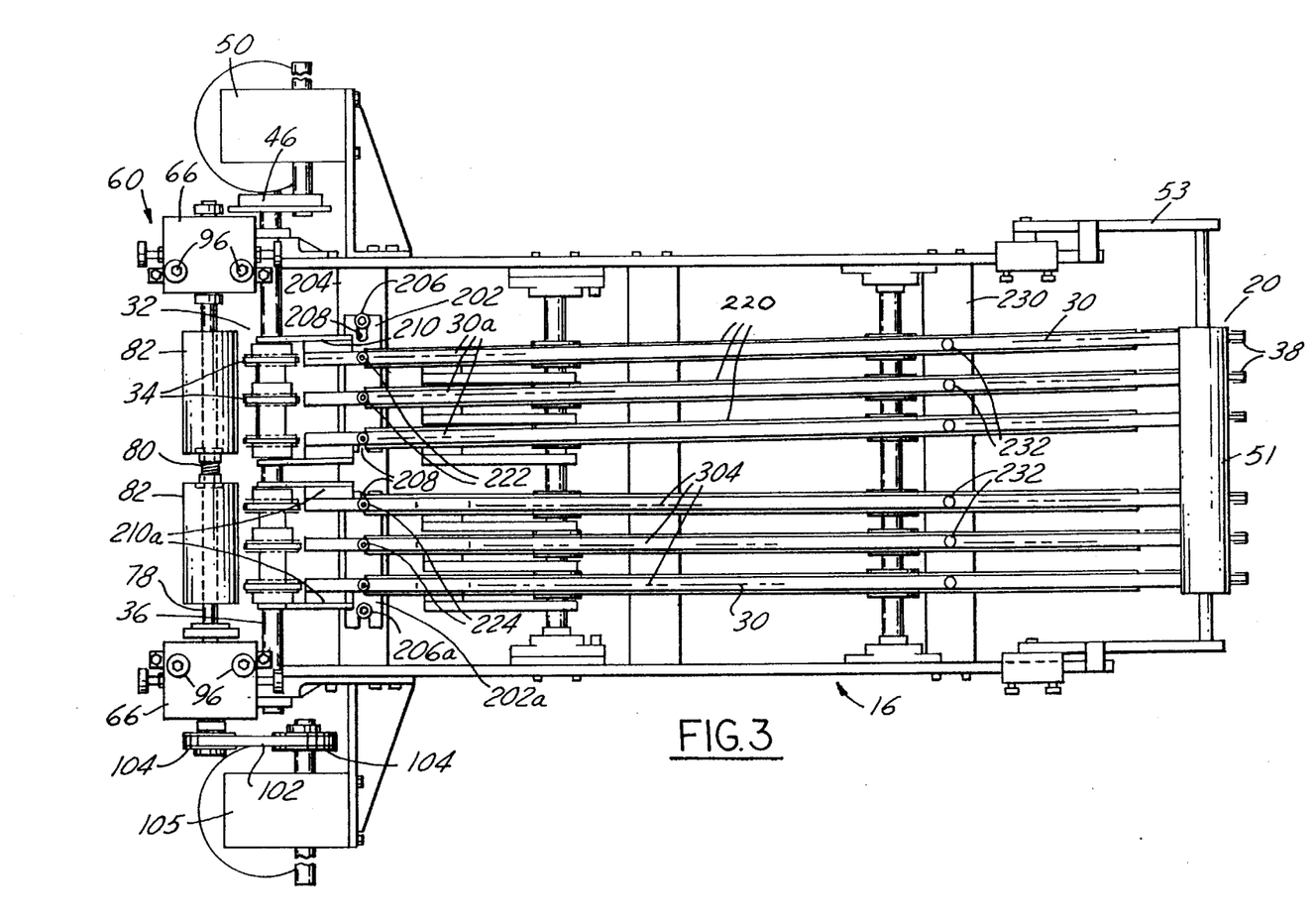
FIG. 3 is an enlargement of a portion of FIG. 2, illustrating the entry conveyor.

As shown in FIG. 3, the chains in the top flight of the entry conveyor are respectively guided by elongated channels 220 which extend for almost the full length of the top flight. The rear end portions of these channels for chains 30a are carried by vertical pivots 222 mounted on the adjustable frame bar 202. The channels 220 for the chains 30b are carried by vertical pivots 224 mounted on the adjustable frame bar 202a. Near their forward ends, the channels are pivoted on a fixed frame member 230 by pivots 232.

When the chains 30a and 30b on the entry conveyor are set at different angles, the rolls of the roll stand 60 may similarly be adjusted to be at the same angle as the chains. This can be accomplished by turning the blocks 62 of the roll stand 60 on frame 64 at an angle about vertical axes when the mounting screws 65 are loosened and then retightening the mounting screws to lock the blocks in the adjusted position. The universal joints connecting the upper and lower rolls will permit this slight angular adjustment. When the chains 30a and 30b are at different angles to handle separated or cut battery plates, an additional plate arrester 24, like the one already described, may be employed so that the plates traveling on the chains 30a may be deflected by one of the plate arresters and those traveling on chains 30b may be deflected by the other plate arrester.

We claim:

1. Apparatus for transporting and stacking rigid battery plate panels comprising, an elongated entry conveyor adapted to support a plurality of rigid battery plate panels deposited thereon in spaced apart sequence and having an unloading end, a first drive for continuously advancing said entry conveyor lengthwise along a predetermined path toward said unloading end so that the panels deposited thereon in the spaced apart sequence will continuously drop one by one over said unloading end in an uninterrupted flow, a stack receiver adjacent to and below the level of the unloading end of said entry conveyor, a stacking elevator having a first panel support adjacent the unloading end of said entry conveyor capable of receiving panels dropped over the unloading end of said entry conveyor, a second drive for raising said stacking elevator so that the first panel support is above said receiver but below the level of the unloading end of said entry conveyor, lowering the stacking elevator during stacking to receive and accumulate a stack of panels thereon, and further lowering said stacking elevator to a position in which the first panel support is below said receiver to transfer the stack of panels accumulated thereon to said receiver, a change elevator having second panel support bars adjacent said unloading end of said entry conveyor capable of receiving panels dropped over the unloading end of said entry conveyor, an actuator operative, when said stacking elevator has accumulated substantially a full stack of panels, for advancing said change elevator longitudinally relative to said unloading end of said entry conveyor to a position in which the second panel support bars are above the first panel support of said stacking elevator but below the unloading end of said entry conveyor to receive and accumulate a partial stack of panels thereon without interrupting the flow of panels and while said stacking elevator is transferring a stack of panels to said receiver, the second drive raising said stacking elevator so that the first panel support is above said receiver and transferring the partial stack of panels from the second panel support bars of said change elevator to said first panel support of said stacking elevator, and the actuator withdrawing said change elevator second panel support bars to a longitudinally retracted position with respect to said first panel support of said stacking elevator to permit panels to be received thereon, whereby the panels are disposed in stacks and the stacks of panels are transported without interrupting the flow of panels over the unloading end of the entry conveyor.

2. Apparatus as defined in claim 1, wherein said stack receiver comprises a take-off conveyor, and a third drive to operate said take-off conveyor to remove the stack of panels thereon.

3. Apparatus as defined in claim 2, wherein said take-off conveyor comprises a plurality of longitudinally extending, laterally spaced conveyor strands, said first panel support of said stacking elevator comprises a plurality of laterally spaced apart first panel support bars movable through spaces between said strands, and said second panel support bars of said change elevator are movable through spaces between said first panel support bars.

4. Apparatus as defined in claim 2, and further including a panel arresting device beyond said unloading end of said entry conveyor to block further advance of the panels after they leave the entry conveyor.

5. Apparatus as defined in claim 1, wherein said change elevator comprises a base, a frame pivotally carried by said base for swinging movement about an axis extending transversely of said predetermined path, said frame having a swinging end on which said second panel support is mounted, the actuator swings said frame, and another actuator for generally vertically raising and lowering said change elevator.

6. Apparatus as defined in claim 5, wherein said first panel support comprises a plurality of horizontally extending and generally laterally spaced apart first bars and said second panel support comprises a plurality of generally laterally spaced apart second bars which extend generally horizontally when in their extended position and can pass generally vertically between said first bars.

7. Apparatus for transporting and stacking rigid battery plate panels comprising, an elongated entry conveyor adapted to support a plurality of rigid battery plate panels deposited thereon in spaced apart sequence and having an unloading end, a first drive for continuously advancing said entry conveyor lengthwise along a predetermined path toward said unloading end so that the panels deposited thereon in the spaced apart sequence will continuously drop one by one over said unloading end in an uninterrupted flow, a stack receiver adjacent to and below the level of the unloading end of said entry conveyor, a stacking elevator having a first panel support adjacent the unloading end of said entry conveyor capable of receiving panels dropped over the unloading end of said entry conveyor, a second drive for raising said stacking elevator so that the first panel support is above said receiver but below the level of the unloading end of said entry conveyor, lowering the stacking elevator during stacking to receive and accumulate a stack of panels thereon and further lowering said stacking elevator to a position in which the first panel support is below said receiver to transfer the stack of panels accumulated thereon to said receiver, a change elevator having a second panel support adjacent said unloading end of said entry conveyor capable of receiving panels dropped over the unloading end of said entry conveyor, an actuator operative, when said stacking elevator has accumulated substantially a full stack of panel, for advancing said change elevator to a position in which the second panel support is above the first panel support of said stacking elevator but below the unloading end of said entry conveyor to receive and accumulate a partial stack of panels thereon without interrupting the flow of panels and while said stacking elevator is transferring a stack of panels to said receivers, the second drive raising said stacking elevator so that the first panel support is above said receiver and transferring the partial stack of panels from the second panel support of said change elevator to said first panel support of said stacking elevator, the actuator withdrawing said change elevator to a retracted position, said stack receiver comprises a take-off conveyor and a third drive to operate said take-off conveyor to remove the stack of panels thereon, said take-off conveyor comprises a plurality of longitudinally extending, laterally spaced conveyor strands, said first panel support of said stacking elevator comprises a plurality of laterally spaced apart first panel support bars movable through spaces between said strands, and said second panel support of said change elevator comprises a plurality of laterally spaced apart second panel support bars movable through spaces between said first panel support bars, and the actuator raises and lowers said second panel support bars of said change elevator and advances and retracts said second panel support bars longitudinally with respect to said take-off conveyor, whereby the panels are disposed in stacks and the stacks of panels are transported without interrupting the flow of panels over the unloading end of the entry conveyor.

8. Apparatus for transporting and stacking battery plate panels comprising, an elongated entry conveyor adapted to support a plurality of rigid battery plate panels deposited thereon in spaced apart sequence and having an unloading end, a stacking station juxtaposed to the unloading end of said entry convey, a first drive for continuously advancing said entry conveyor lengthwise along a predetermined path toward said unloading end so that the panels deposited thereon will continuously drop one by one over said unloading end at said stacking station in an uninterrupted flow, a panel arresting device beyond the unloading end of said entry conveyor to block further advance of the panels after they leave the entry conveyor so that they will drop as aforesaid substantially vertically at said stacking station, an elongated take-off conveyor adjacent to and below the level of the unloading end of said entry conveyor and extending through said stacking station in continuation of said predetermined path, a stacking elevator at said stacking station having a first panel support capable of receiving panels dropped over the unloading end of said entry conveyor, a second drive for raising said stacking elevator so that the first panel support is above said take-off conveyor but below the level of the unloading end of said entry conveyor to receive and accumulate a stack of panels thereon and for lowering said stacking elevator to a position in which the first panel support is below said take-off conveyor to transfer the stack of panels accumulated thereon to said take-off conveyor, a change elevator having a second panel support capable of receiving panels dropped over the unloading end of said entry conveyor, a third drive, responsive to the lowering of said stacking elevator to a position in which said stacking elevator has accumulated substantialy a full stack of panels, for advancing said second panel support of said change elevator generally longitudinally of said take-off conveyor to a position at said stacking station in which the second panel support is above the first panel support of said stacking elevator but below the level of the unloading end of said entry conveyor to receive and accumulate a partial stack of panels thereon without interrupting the flow of panels and while said stacking elevator is transferring a stack of panels to said take-off conveyor, and for lowering said change elevator as said partial stack of panels accumulates on said second panel support, the second drive raising said stacking elevator so that the first panel support is above said take-off conveyor and above said second panel support of said change elevator for transferring the partial stack of panels from the second panel support to said first panel support, the third drive responsive to the raising of said stacking elevator to a position such that the first panel support is above said second panel support for retracting said second panel support of said change elevator longitudinally of said take-off conveyor to a position withdrawn from said stacking station, and a fourth drive for advancing said take-off conveyor to remove the stack of panels thereon away from said stacking station, said take-off conveyor comprises a plurality of longitudinally extending, laterally spaced conveyor strands, said first panel support of said stacking elevator comprises a plurality of laterally spaced apart first panel support bars movable through spaces between said strands, and said second panel support of said change elevator comprises a plurality of laterally spaced apart second panel support bars movable through spaces between said first panel support bars, and said change elevator comprises a base, a frame pivoted to said base for swinging movement about an axis extending transversely of said predetermined path, said frame having a swinging end on which said second panel support bars are mounted, and said third drive has a first actuator mounted on said base for swinging said frame, and a second actuator connected to said base for raising and lowering said change elevator.

9. Apparatus as defined in claim 8, wherein said first support bars are horizontal and said second support bars are horizontal when in an advanced position.

10. Apparatus for transporting and stacking battery plate panels comprising, an elongated entry conveyor adapted to support a plurality of rigid battery plate panels deposited thereon in spaced apart sequence and having an unloading end, a stacking station juxtaposed to the unloading end of said entry conveyor, a first drive for continuously advancing said entry conveyor lengthwise along a predetermined path toward said unloading end so that the panels deposited thereon will continuously drop one by one over said unloading end at said stacking station in an uninterrupted flow, a panel arresting device beyond the unloading end of said entry conveyor to block further advance of the panels after they leave the entry conveyor so that they will drop as aforesaid substantially vertically at said stacking station, an elongated take-off conveyor adjacent to and below the level of the unloading end of said entry conveyor and extending through said stacking station in continuation of said predetermined path, a stacking elevator at said stacking station having a first panel support capable of receiving panels dropped over the unloading end of said entry conveyor, a second drive for raising said stacking elevator so that the first panel support is above said take-off conveyor but below the level of the unloading end of said entry conveyor, lowering the stacking elevator during stacking to receive and accumulate a stack of panels thereon and further lowering said stacking elevator to a position in which the first panel support is below said take-off conveyor to transfer the stack of panels accumulated thereon to said take-off conveyor, a change elevator having second panel support bars capable of receiving panels dropped over the unloading end of said entry conveyor, a third drive responsive to the lowering of said stacking elevator to a position in which said stacking elevator has accumulated substantially a full stack of panels, for advancing said second panel support bars of said change elevator generally longitudinally of said take-off conveyor to a position in said stacking station in which the second panel support bars are above the first panel support of said stacking elevator but below the level of the unloading end of said entry conveyor to receive and accumulate a partial stack of panels thereon without interrupting the flow of panels and while said stacking elevator is transferring a stack of panels to said take-off conveyor, and for lowering said change elevator as said partial stack of panels accumulates on said second panel support bars, second drive raising said stacking elevator so that the first panel support is above said take-off conveyor and above said second panel support bars of said change elevator for transferring the partial stack of panels from the second panel support bars to said first panel support, the third ,drive responsive to the raising of said stacking elevator to a position such that the first panel support is above said second panel support bar for retracting said second panel support bars of said change elevator generally longitudinally of said take-off conveyor to a position withdrawn from said stacking station, and a fourth drive for advancing said take-off conveyor to remove the stack of panels thereon away from said stacking station, whereby the panels are disposed in stacks and the stacks of panels are transported without interrupting the flow of panels over the unloading end of the entry conveyor.

11. Apparatus as defined in claim 10, wherein said entry conveyor comprises a plurality of longitudinally extending laterally spaced conveyor strands, wherein the strands of the entry conveyor include a first set of strands adjacent one side of the entry conveyor and a second set of strands adjacent the other side thereof, and further including means for adjustably mounting the first set of strands so that they may be angled away from the second set of strands in the direction of advance of the entry conveyor.

12. Apparatus as defined in claim 11, and further including a roll stand for delivering panels to said entry conveyor.

13. Apparatus as defined in claim 12, wherein said roll stand is located at the loading end of said entry conveyor, said roll stand comprising a first set of upper and lower rolls associated with said first set of strands and a second set of upper and lower rolls associated with said second set of strands, each set of rolls being adapted to grip panels therebetween and advance them to the entry conveyor, said upper rolls being mounted end-to-end on an upper shaft, said lower rolls being mounted end-to-end on a lower shaft, said upper and lower shafts each including a flexible section between the rolls thereon, and adjustable means mounting said shafts to permit turning the rolls thereon to positions corresponding to an angle between said first and second sets of strands.

14. Apparatus as defined in claim 12, wherein said roll stand is located at the loading end of said entry conveyor and comprises upper and lower rolls adapted to grip panels therebetween and advance them to the entry conveyor.

15. Apparatus as defined in claim 10, wherein said take-off conveyor comprises a plurality of longitudinally extending, laterally spaced conveyor strands, said first panel support of said stacking elevator comprises a plurality of laterally spaced apart first panel support bars movable through the spaces between said strands, and said second panel support bars of said change elevator are laterally spaced apart and movable through spaces between said first panel support bars.

16. Apparatus as defined in claim 15, and further including a roll stand at the loading end of said entry conveyor for delivering panels to said entry conveyor.

17. Apparatus as defined in claim 16, wherein said roll stand comprises upper and lower rolls adapted to grip panels therebetween and advance the panels to the entry conveyor.

18. Apparatus as defined in claim 17, wherein said upper and lower rolls grip the panels with enough force to separate them into individual plates if not completely parted in a previous cutting operation.

19. Apparatus as defined in claim 17, and further including means for varying the spacing between said rolls.

20. Apparatus as defined in claim 17, and further including means for varying the spacing between said rolls and maintaining a predetermined spaced relationship therebetween with yielding pressure.

21. Apparatus as defined in claim 17, and further including adjusting means for supporting one of said rolls relative to the other in selected adjusted positions.

22. Apparatus as defined in claim 21, wherein said adjusting means is capable of adjusting said one roll so that said upper roll is disposed vertically above said lower roll or above said lower roll but offset either forwardly or rearwardly relative thereto.

23. An apparatus for stacking battery plate panels comprising, an elongated entry conveyor for supporting and continuously conveying a plurality of rigid battery plate panels deposited thereon in spaced apart relationship and having an unloading end over which the panels being continuously advanced by the conveyor will drop one by one into a stacking station in an uninterrupted flow, the stacking station being at the unloading end of said entry conveyor, an arresting device beyond the unloading end of the entry conveyor to block further advance of the panels after they leave the entry conveyor so that the panels drop substantially vertically into the stacking station, a take-off conveyor adjacent to and below the level of the unloading end of the entry conveyor and extending into and beyond the stacking station, a stacking elevator in said stacking station having a first panel support capable of receiving panels dropped over the unloading end of the entry conveyor and movable generally vertically so that when the first panel support is above said take-off conveyor and below the unloading end of the entry conveyor it receives and accumulates a stack of panels thereon, and movable to a lowered position in which the first panel support is below the take-off conveyor to transfer the stack of panels accumulated thereon to the take-off conveyor, and a change elevator having a second panel support movable generally longitudinally to extended and retracted positions relative to the unloading end of the entry conveyor and generally vertically relative to the first panel support of the stacking elevator to positions above and below the first panel support so that when the second panel support on the change elevator is longitudinally extended and above the first panel support but below the level of the unloading end of the entry conveyor it receives and accumulates a partial stack of panels thereon without interruption of the flow of panels and while the stacking elevator transfers a stack of panels to the take-off conveyor, as the second support moves relatively below the first support the partial stack of panels is transferred to and further accumulates on the first support of the stacking elevator, and when the second support is below the first support and disengaged from the partial stack of panels, the change elevator is moved to its longitudinally retracted position to withdraw the second support from the path of travel of the stacking elevator as it is being lowered toward the take-off conveyor, whereby the panels are disposed in stacks and the stacks of panels are transported without interrupting the flow of panels over the unloading end of the entry conveyor.

* * * * *